Feb. 8, 1938.    E. S. HUMPHREYS    2,107,825
X-RAY APPARATUS
Filed April 30, 1928    10 Sheets-Sheet 1

Inventor
Edwin S. Humphreys
By Jones, Addington, Ames & Seibold
Attys.

Feb. 8, 1938.  E. S. HUMPHREYS  2,107,825
X-RAY APPARATUS
Filed April 30, 1928  10 Sheets-Sheet 4

Inventor:
Edwin S. Humphreys.
By Jones, Addington, Ames & Seibold
Attorneys.

X-RAY APPARATUS

Filed April 30, 1928    10 Sheets-Sheet 7

UNITED STATES PATENT OFFICE 2,107,825

X-RAY APPARATUS

Edwin S. Humphreys, Aurora, Ill.

Application April 30, 1928, Serial No. 273,794

29 Claims. (Cl. 250—34)

This invention relates to an apparatus for permitting the study of the anatomy either for temporary observance or for permanent record and has special reference to an apparatus for taking a series of roentgenograms or X-ray photographs showing closely related positions in the movement of any organ of the anatomy.

More particularly, this invention relates to an apparatus comprising a casing impervious to X-rays having an unexposed film box in one end thereof and an exposed film box in the other end thereof, both of these boxes being disposed in a spaced relation and having an electrically operated shifting mechanism therebetween for gripping one of a plurality of film holding frames in the unexposed film box, presenting the film for exposure, and subsequently moving the film holding frame out of the plane of exposure into the exposed film box.

In the apparatus briefly outlined above, a plurality of film holding frames are disposed in one of the film boxes, each frame being provided with a film, the frames being moved automatically and with any desired rapidity into the plane of exposure, thereat to record various and particularly consecutive positions of movable organs of the anatomy which latter is positioned between the film and an X-ray tube.

As a practical illustration of the operation of the above noted structure, it may be desirable to obtain a number of permanent records for critical examination of the intestines at various periods of the peristaltic cycle with the patient completely relaxed. This operation must be completed quickly and without moving the patient in order to obtain the most desirable results. The peristaltic cycle is the peculiar involuntary muscular movement of the intestines or other movable organs whereby the contents thereof are propelled onward and consists of rhythmic circular contractions of the circular and longitudinal muscular fibers. In thus viewing a series of roentgenograms in consecutive positions, there is a minimum liability of error in the diagnosis because what may appear to be an abnormal or diseased condition on account of a peculiar position of the intestines in one period of its cycle may be found to be normal in the next successive positions. Further, certain positions in the cycle are better adapted for examination than others and ordinarily, it is a matter of chance to locate and to record a desired position.

In the operation of this invention, a novel, simple and efficient film holding frame is employed to replace the ordinary cassette of the prior art. As will hereinafter be apparent, a great saving may be obtained in the handling of this film holding frame and also a great saving may be obtained in time and in expense. For example, a number of frames may be furnished with films and located in the film box, the films being permitted to remain in the same frame while undergoing developing, while drying and while being subsequently viewed in the viewing cabinet or rack. Thus time in handling is minimized to a desirable degree.

As involves expense, the ordinary cassettes for holding the negatives or films as now used, are provided usually with a pair of fluorescent screens which latter speed up the time of exposure and without which the time required to expose a film would consume from three to four times as long. In the present invention, these intensifying screens are disposed in the apparatus and are omitted from the film holding frames, the one set to be used in common with all films presented for exposure. As a result, in place of one set of screens for each exposure, it is only necessary to provide one set of screens for all exposures and the subsequent saving in the outlay for screens alone which would be necessary to take a series of roentgenograms will be sufficient to purchase the entire machine of this invention. Further, an even more beneficial result resides in the fact that a uniform exposure of all negatives will be obtained; whereas, it will be apparent that various fluorescent screens register differently and preclude a desirable uniformity in related exposures.

Unless otherwise desired, the operation of the apparatus is automatic; that is, upon the energization of the circuit, a complete cycle is instituted as when one film is exposed the shifting mechanism moves to the unexposed box and grips another film and holding frame, returns and presents the same for exposure, the latter return movement depositing the previously exposed film and holding frame into the exposed film box. These operations may be continuous whereby the cycle is completed a number of times before coming to a complete rest, and the exposure of the film may occur during the movement of the shifting mechanism.

Other objects and advantages will hereinafter be described and for a more complete understanding of the nature, characteristics and scope of this invention, reference may now be had to the following description and accompanying drawings, in which latter.

Referring now more particularly to the drawings, the apparatus of this invention comprises a lead sheathed casing which is fully enclosed and impervious to X-rays. The top and side walls of the lead-sheathed casing may be composed of spaced metal walls having lead plates and felt packing disposed therebetween. This structure may be supported upon a common sheet metal base, the ends of which latter are preferably formed to provide a spaced relation with the platform upon which it may rest. The top plate 10 is preferably hinged to the side walls or may be removably secured thereto and has an exposure area transparent to X-rays comprising a window 35 disposed centrally longitudinally and laterally thereof.

An auxiliary housing 36 is mounted on one side of the casing for containing a portion of the operating mechanism. This mechanism comprises a motor 37 which is secured to the side wall of the casing in any suitable manner, the motor having a worm 38 fixedly mounted on the motor shaft thereof. A worm wheel 39, engaging the worm 38, is fixedly mounted on a stud shaft 40 on the casing, the latter shaft in turn having a pinion 41 fixedly mounted thereon for engaging a pinion 42 rotatably mounted on a stud shaft also extending from the side wall of the casing. A gear 43 is suitably mounted on a stud shaft extending from the side wall of the casing and obtains an oscillating movement by means of a connecting rod 44 suitably connected between the gears 43 and 42, the gear 42 making a complete revolution to oscillate the gear 43. The gear 43, being of a substantially larger diameter than the pinion 45 which it engages, rotates the pinion 45 for a number of revolutions in one direction as it oscillates in one direction and thereafter rotates the pinion 45 in a reverse direction to its original position as it oscillates in the other direction. Pinion 45 is fixedly mounted on a shaft 46 which latter extends through the casing and is journalled in both side walls thereof.

Figure 1:
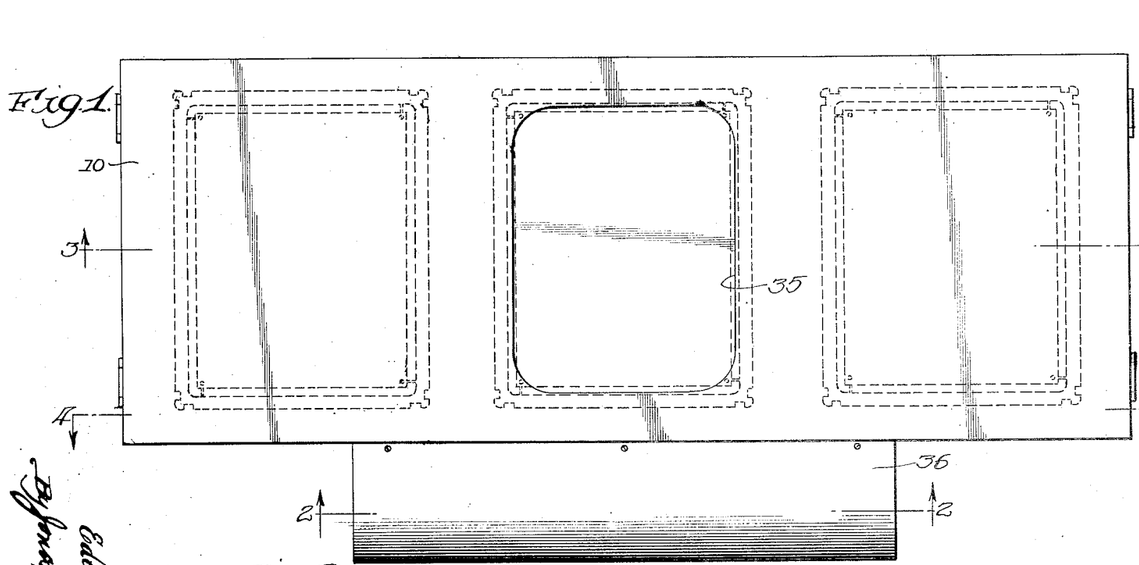
Figure 2:
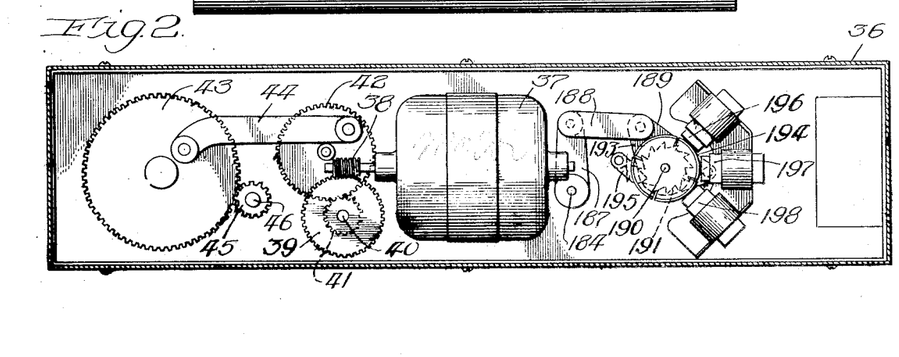
Fig. 2 is a vertical sectional view taken on the line 2—2 of Fig. 1.
Figure 3:
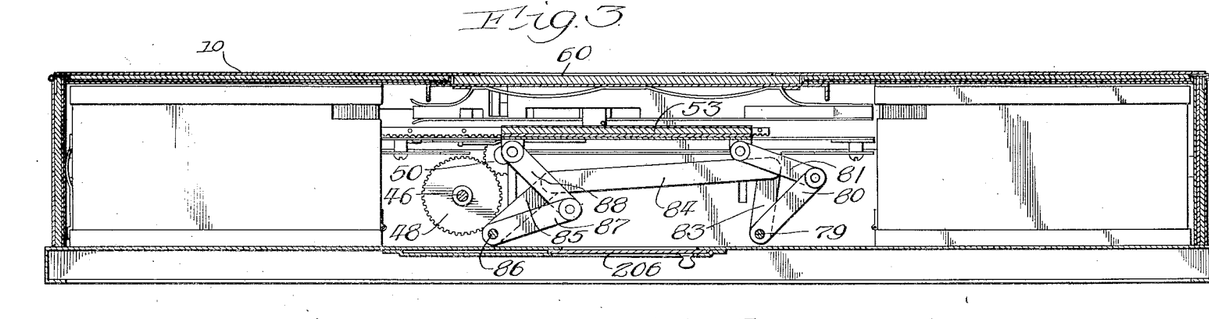
Fig. 3 is a central vertical sectional view taken on the line 3—3 of Fig. 1.
Figures 4, 5:
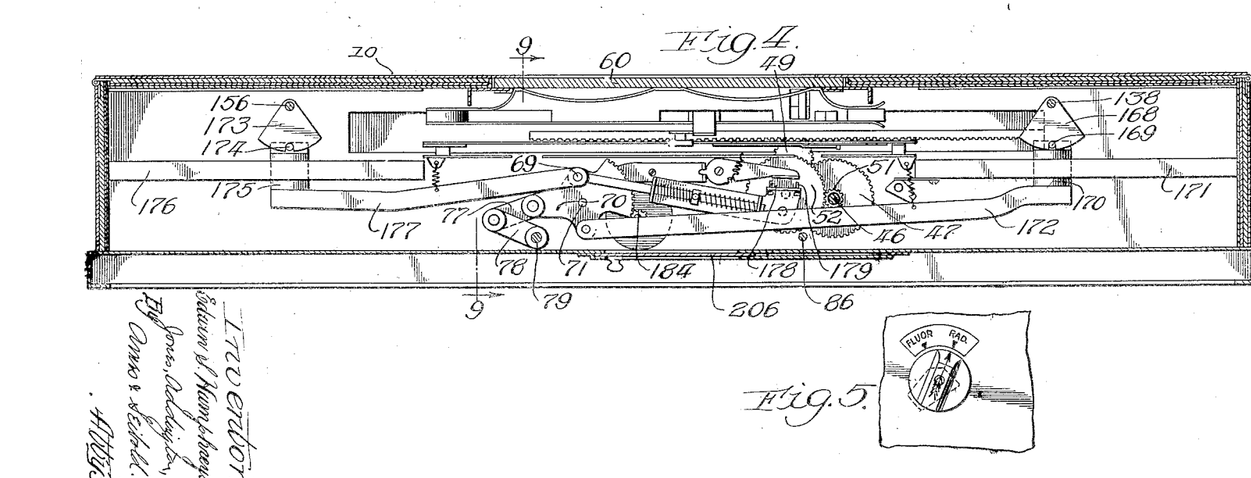
Fig. 4 is a view similar to Fig. 3 looking in the opposite direction and taken on the line 4—4 of Fig. 1.
Fig. 5 is a fragmentary elevational view of a switch member.
Figures 6, 7, 8:
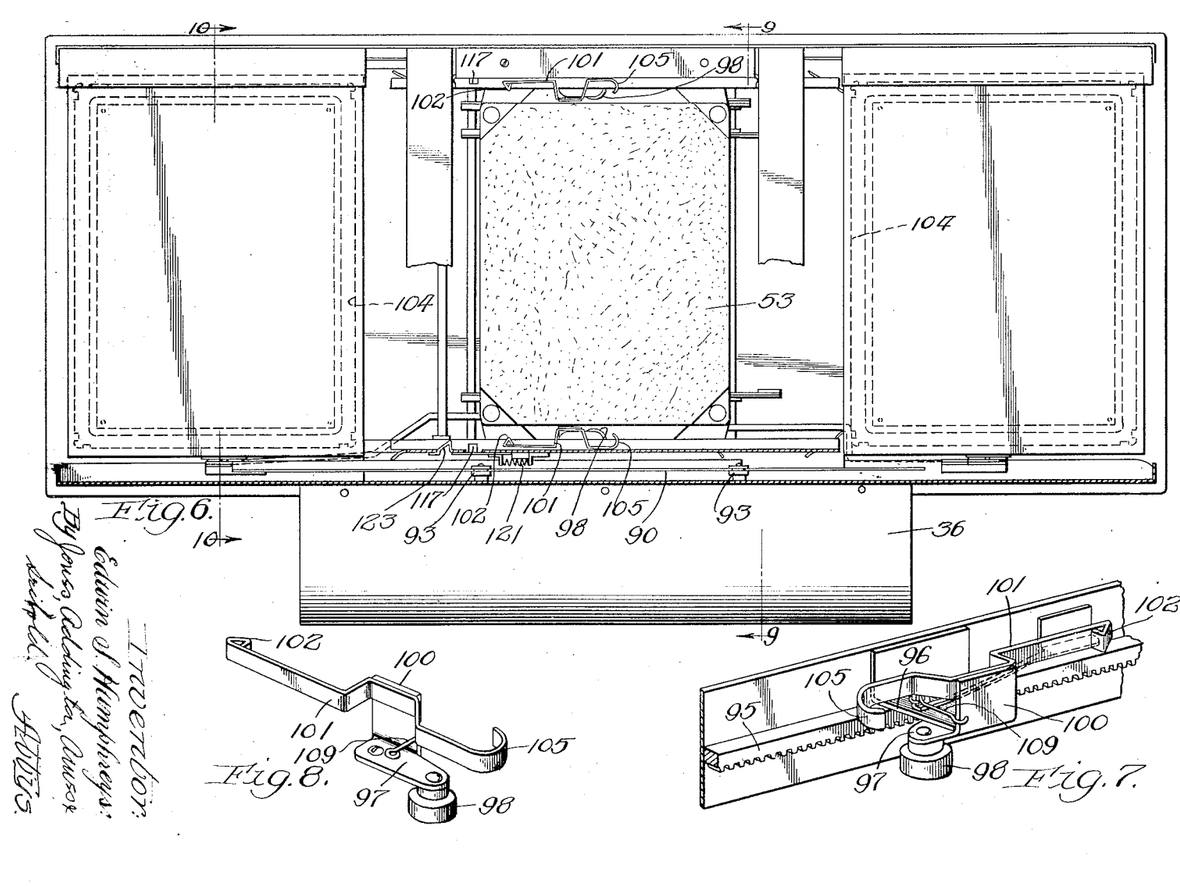
Fig. 6 is a plan elevational view partially in section of the apparatus of this invention with the top cover therefor removed.
Fig. 7 is a perspective view of a fragmentary portion of the apparatus showing a gripping finger and its associated parts.
Fig. 8 is a perspective view of the gripping finger of Fig. 7 taken at an angle from the opposite side thereof.

The shaft 46 is the initial actuating means for the mechanism to be hereafter described and is disposed on the interior of the casing as shown more particularly in Figs. 3 and 4 of the drawings. A pair of gears 47 and 48 are fixedly mounted on the shaft 46 adjacent opposite side walls of the casing respectively for engagement with a pair of pinions 49 and 50 respectively, the latter pinions being mounted on stud shafts extending from their respective side walls. A pinion 51 is also fixedly mounted on the shaft 46 adjacent the gear 47 and engages a gear 52 which latter is mounted on a stud shaft extending from the side wall of the casing and is disposed in a spaced relation therewith. Thus we have a proximate motivating force in the gears 49, 50 and 52 for operating respectively a shifting mechanism and a compressor plate or supporting mechanism which latter will now be described.

Figure 9:
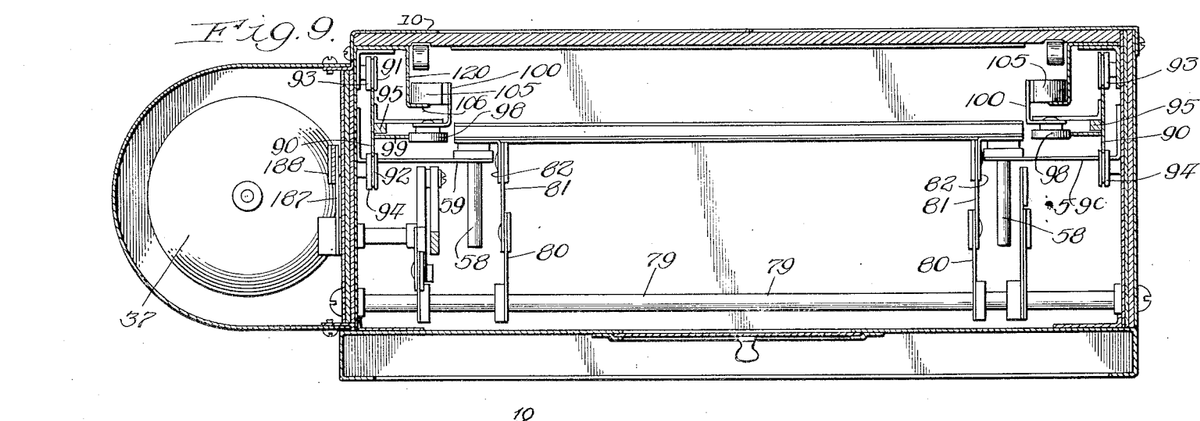
Fig. 9 is a vertical sectional view taken laterally of the apparatus and on the lines 9—9 of Fig. 6.
Figure 10:
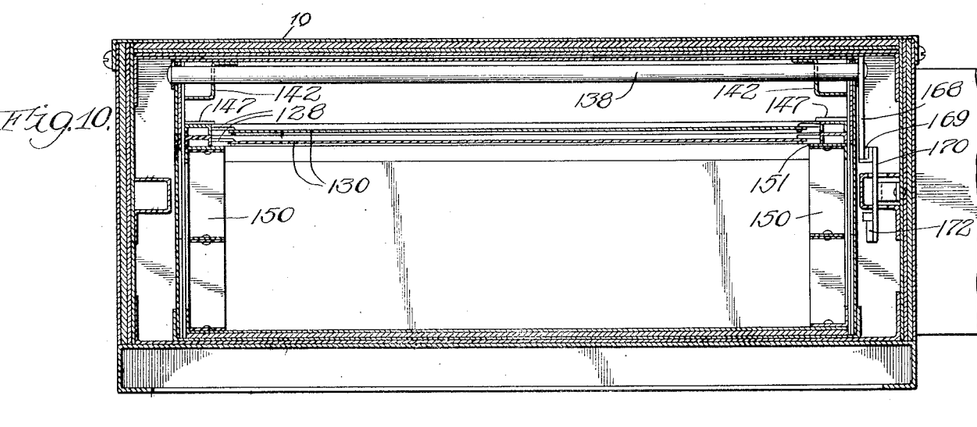
Fig. 10 is a view similar to Fig. 9 looking in the opposite direction and taken on the line 10—10 of Fig. 6.

The compressor plate 53 comprises a platform which is movable vertically and is disposed in the plane of exposure directly beneath the window 35 of the casing. The platform preferably comprises an aluminum plate 54 on top of which is disposed a felt pad 55. A fluorescent screen 56 is fixed to the top of the felt pad 55 and a second fluorescent screen 57 is secured to the underneath side of the aluminum plate 54. A plurality of guide rods 58 are secured to the preferably rectangularly shaped supporting platform, one to each corner thereof, and extend through apertures in guide brackets 59 which latter are suitably fixed to the side walls of the casing as shown more particularly in Figs. 9 and 18 of the drawings.

The compressor plate 53 preferably cooperates with a bakelite panel 60 secured to the underneath side of the outer metal casing to enclose the window 35, the panel extending beyond the confines thereof. Suitable brackets 61 hold the bakelite panel 60 in a snug relation with the underneath side of the casing. A fluorescent screen 62 is mounted on the underneath side of the panel 60 and conforms in size and shape to the supporting platform 53. It may here be stated that the vertical movement of the compressor plate 53 holds the unexposed film in a snug engagement with the bakelite panel and between the fluorescent screens 56 and 62 while the film is being exposed.

In order to operate the compressor plate or supporting platform into its upper and lower positions, a bracket 63 is pivotally and eccentrically mounted as at 64 to the gear 52, the bracket 63 having an extension 65 preferably integrally formed thereon on which latter an elongated U-shaped member is secured having a pair of spaced ears 66 and 67. A shaft 68 extends through and is journalled in apertures in the ears 66 and 67 and is pivotally secured at one end, as at 69, to a pivotally mounted actuating member 70, the actuating member being pivoted as at 71 to the side wall of the casing. A collar 72 is mounted on the shaft 68 and is adjustably secured thereto by means of the set screws 73. A pair of spring members 74 and 75 are mounted on each side of the collar 72 and extend therefrom to engage the ears 66 and 67, respectively. It will be noted that one end of the shaft 68 is pivotally mounted and that the other end thereof is free, there being no fixed relation between the shaft 68 and the bracket 63 except as through the spring members 74 and 75.

Figure 11:
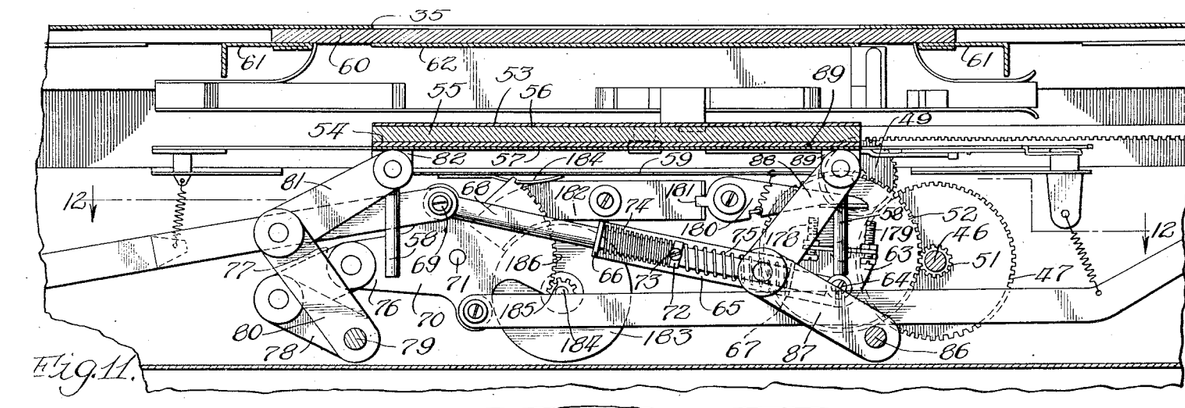
Fig. 11 is an enlarged central sectional view of a portion of the apparatus showing more particularly the supporting mechanism thereof.
Figure 12:
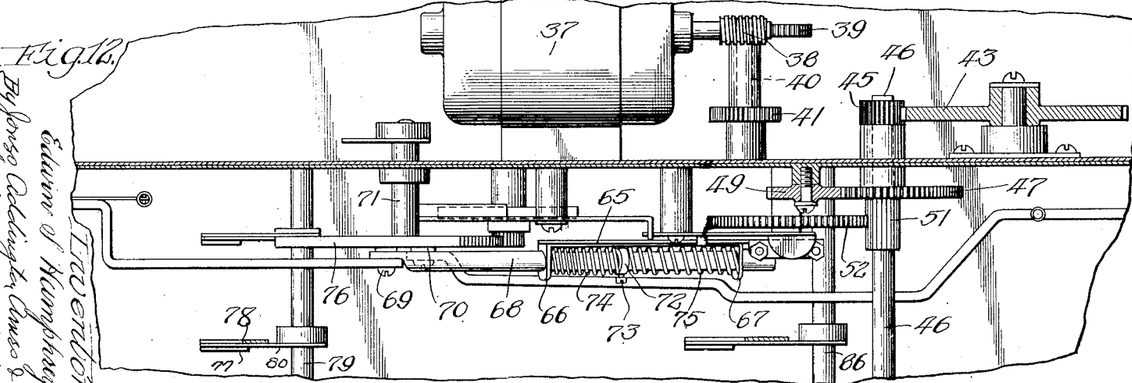
Fig. 12 is a fragmentary enlarged sectional view taken on the line 12—12 of Fig. 11.
Figure 13:
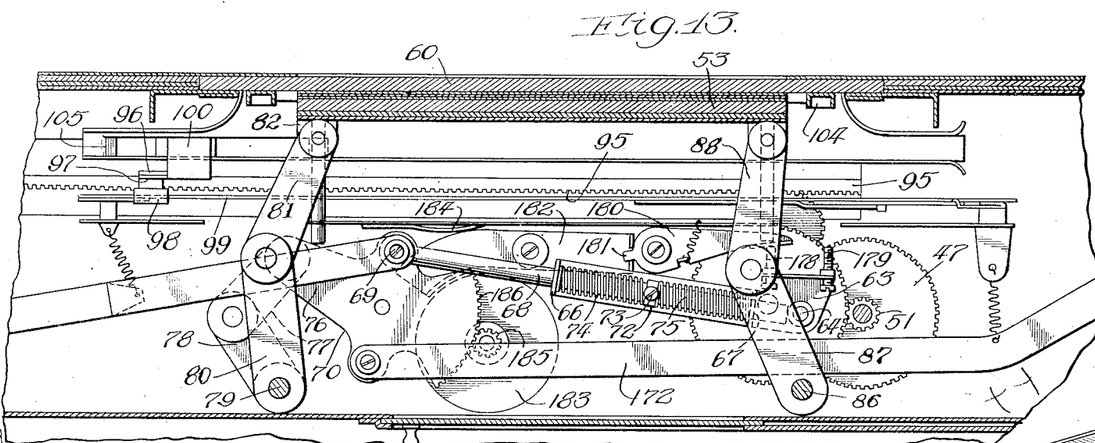
Fig. 13 is a view similar to Fig. 11 showing a changed position of the support and operating mechanism therefor.
Figure 14:
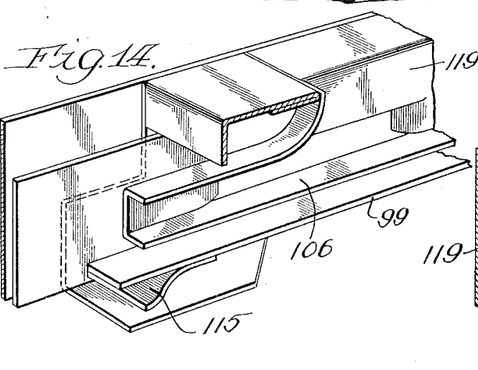
Fig. 14 is a perspective view of a portion of the apparatus showing particularly the guiding means and cam actuating means for the gripping finger.
Figure 15:
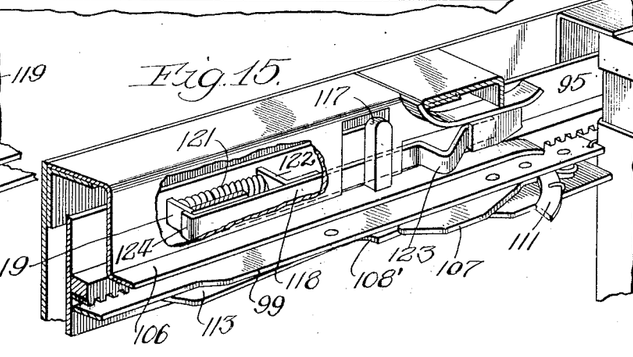
Fig. 15 is a perspective view of the guiding means taken at the opposite end from that of Fig. 14 showing the operating mechanism for actuating one of the gripping fingers prior to presenting the film holding frame for exposure.

As the gear 52 is oscillated, the bracket 63 moves either in a direction toward the pivotal connection 69 or away therefrom. When the bracket 63 is moved toward the pivotal connection 69, the ear 67 engages the spring 75, having engagement with the spring retaining collar 72, so as to effect the compression thereof in a direction toward the pivotal connection 69, and when the compression of the spring 75 is great enough the actuating member 70 is pivoted on its pivot 71 as, for example, from the position shown in Fig. 13 to the position shown in Fig. 11 of the drawings. Conversely, when the bracket 63 travels in the opposite direction, the compression of the spring member 74 between the ear 66 and the collar 72 operates the shaft 68 in an opposite direction to pivot the actuating member 70 likewise in an opposite direction. In both instances, the springs 74 and 75 act to develop a quick action of the movement of the compressor plate. We have obtained thus far a pivotal movement of the actuating member 70 by means of an oscillatory movement of the gear 52.

The actuating member 70 is provided with an arm 76 to which is pivotally connected a pair of link members 77 and 78, the latter link member being fixedly secured to a shaft 79 extending between and being journalled in the side walls of the casing. A pair of link members 80 are likewise fixedly mounted on the shaft 79, one of said link members being disposed adjacent either side of the side walls of the casing and being connected to link members 81 which latter are in turn pivotally mounted on brackets 82 secured to the aluminum plate 54. A link member 83 is secured to the shaft 79 adjacent one of the side walls and is connected by means of a connecting link 84 and a link 85 to a shaft 86 which latter extends between and is journalled in the side walls of the casing, the link 85 being fixedly secured to the shaft 86. A pair of link members 87 are fixedly secured to the shaft 86, one of said link members being disposed adjacent each side wall of the casing, these link members extending to be connected to a pair of link members 88 which latter are in turn pivotally connected to brackets 89.

In the operation of this latter described mechanism when the actuating member 70 is pivoted, the link members 77 and 78 impart a partial rotation to the shaft 79. The link member 83 being fixedly connected to the shaft 79 imparts a partial rotation to the shaft 86 through the link members 84 and 85. Thus, a partial rotation of the shafts 79 and 86 imparts a vertical movement to the supporting platform 53 through their respective link members 80—81 and 87—88.

Inasmuch as the shifting mechanism cooperates with the supporting mechanism, the former gripping a film in the unexposed film box and depositing the same on the supporting platform for exposure, the shifting mechanism will now be described: A guide bar 90 is disposed adjacent each side wall of the casing, the upper and lower edges thereof engaging grooves 91 and 92 in a pair of vertically and longitudinally spaced rollers 93 and 94, respectively, the latter members being rotatably mounted on the side walls of the casing. A rack 95 is fixedly secured to one side of the guide bar 90 and engages the pinion 49. This construction is shown particularly in Figs. 16, 17 and 20 of the drawings. Upon a rotation of the pinion 49, it will be apparent that the guide bar 90 will be moved longitudinally of the casing in one direction to be returned to its original position by a movement of the pinion 49 in a reverse direction.

A bracket 96 is secured to one side of the guide bar 90 and extends laterally therefrom or at right angles thereto. An arm 97 is pivotally mounted on the underneath side of the bracket 96 and has a roller 98 mounted on the free end thereof to engage the edge of a guide bar 99 as the bracket 96 travels transversely of the apparatus. The pivotal arm 97 has an upwardly projecting lip 100 to which is secured a finger 101 with a lip 102 at the outermost portion of one end thereof which latter engages a recessed portion 103 of a film holding frame 104. The other end of the finger is curved as at 105 to provide a bearing surface for engaging the rear edge of a film holding frame after the same has been in the plane of exposure.

The gripping finger extends above the bracket 96 and rides on a ledge portion 106. As the gripone direction preparatory to gripping the film holding frame, the roller 98 rides upon a cam arm 107 as shown more particularly in Fig. 18, this position likewise being shown in Fig. 16, to pivot the gripping finger in a direction so that the lip 102 passes outside the confines of the film holding frame 104. The roller 98 thereafter is directed downwardly by the inclined surface on the cam arm 107 against the guide bar 99 whereafter the gripping finger is permitted to pivot back to its normal position whereupon the lip 102 engages the notch 103. The arm 97, on which the roller 98 is mounted, is held in a normal position whereby the roller 98 engages the guide bar 99 by means of a spring member 108 secured to the guide bar 90 at one end thereof, the free end of member 108 being connected to the vertically extending portion 100 of the arm 97 by means of a link 109.

Figures 16, 17, 18, 19, 20:
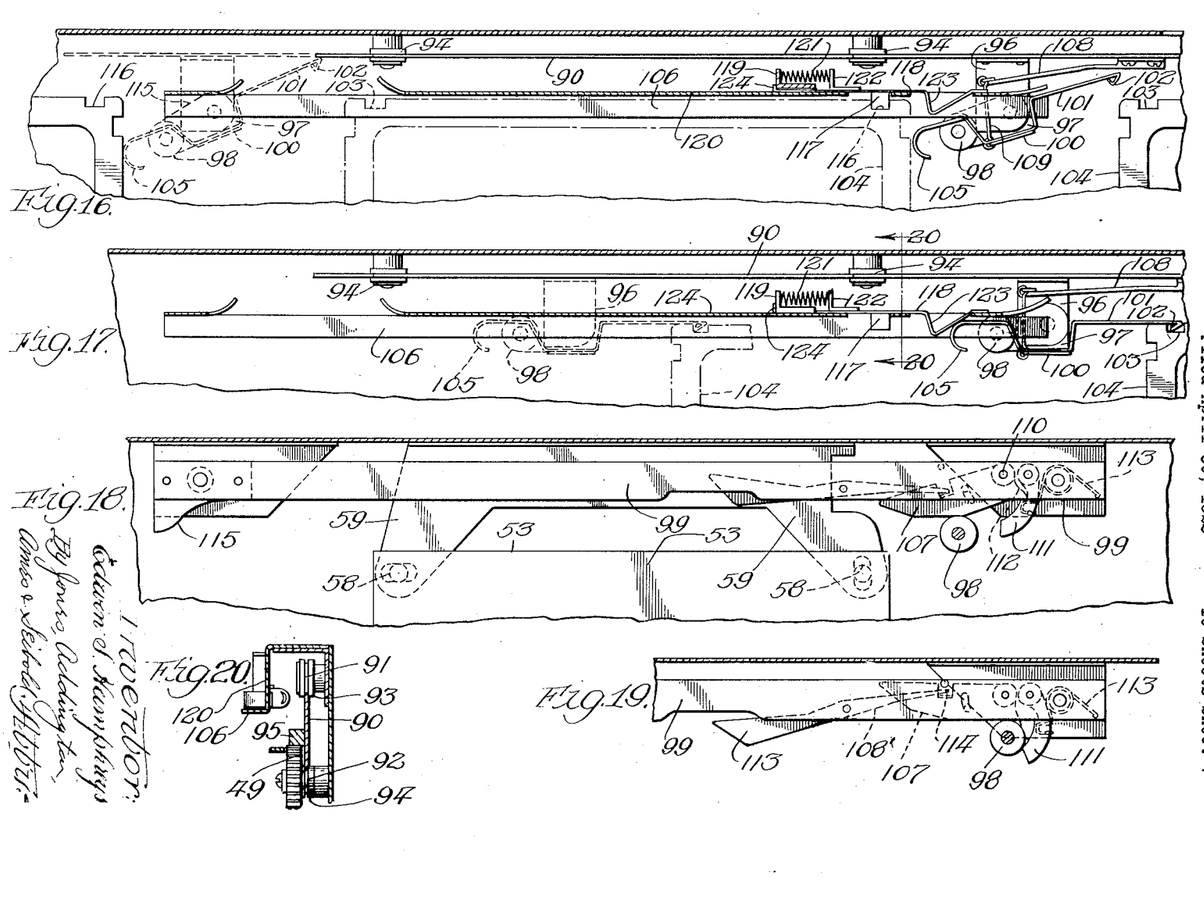
Fig. 16 is a fragmentary plan view partially in section showing more particularly the gripping finger just prior to engaging a film holding frame.
Fig. 17 is a view similar to Fig. 16 showing the gripping finger in engagement with the film holding frame.
Fig. 18 is a view similar to Fig. 17 showing more particularly the cam means for operating the gripping finger.
Fig. 19 is a view of a portion of Fig. 18 showing a changed position of the elements therein.
Fig. 20 is a vertical sectional view taken on the line 20—20 of Fig. 17.
Figure 21:
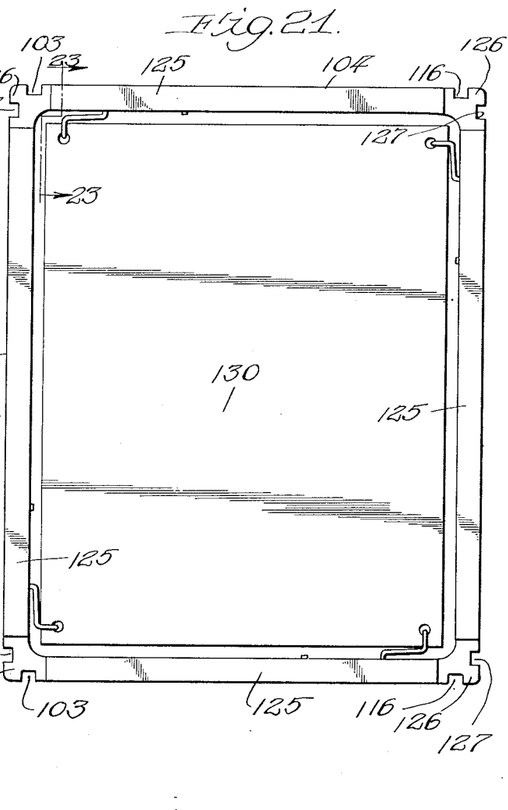
Fig. 21 is a plan elevational view of a film holding frame with a film disposed therein.

In order that the cam arm 107 does not release the gripping finger from the film holding frame 104 in the movement of the frame in a direction to the supporting platform, the arm 107 is pivotally secured to the underneath side of the guide bar 99 as at 110 and is held in an outwardly extended position such as is shown in Fig. 18 by means of a pivotally mounted lever arm 111, the latter being provided with a notch for engaging a projecting ear 112 of the cam arm 107. The lever 111 is held in a position against the cam arm 107 by means of a spring tensioning element 113.

When the roller 98 engages the lever 111, the former moves the latter out of engagement with the cam arm 107, this position being shown in Fig. 19, whereafter the cam arm will be pivoted inwardly by the movement of the roller 98 in its rearward movement, the spring tension inherent in the flat resilient lever 108 causing the roller 98 to bear against the cam arm 107. As the cam arm 107 is moved inwardly, one end of the lever 108', which latter is in engagement with the cam arm 107 is likewise caused to move inwardly and, being pivotally mounted on the guide arm 99 at a central point thereof, causes the other end 113 to move outwardly beyond the confines of the guide bar 99. As the roller 98 continues its movement to the left of its position shown in Fig. 19, the roller engages the end 113 of the lever 108' causing the same to pivot in an opposite direction whereby the end 114 pivots the cam arm 107 back into the position as is shown in Fig. 18 whereby the projecting ear 112 engages the notch in the member 111 to hold the cam arm 107 in its normal operative position. Thus, it will be seen that a movement of the roller 98 in a direction to the right of the drawings, will ride up the incline of the cam arm 107 to pivot the gripping finger so as to be in a position to engage the film holding frame whereafter the roller 98 rides down the incline of the cam arm 107 continuing its movement in the same direction to engage the member 111 which latter action releases the projecting ear 112 therefrom to permit the roller 98 to push the cam arm 107 to its normal inoperative position thereby to permit the gripping finger to grip the film holding frame and move the latter to the left.

After the gripping finger has reached a predetermined position carrying with it the film holding frame 104, the roller 98 engages a cam surface 115 formed on the opposite end of the guide bar 99 to again pivot the arm 97, and consequently, the gripping finger 101 to a position such that the lip 102 disengages the notch 103. This position is reached at the limit of the movement of the guide bar 90 on rack 95 in its direction to the left and an opening in the channel shaped end of the supporting ledge 106 is provided to permit of the pivoting of the gripping finger 101. A film holding frame is thus deposited on the compressor plate 53 and the gripping finger is then ready to present a new film holding frame after the present film holding frame has been exposed. The dotted line position of the gripping finger as shown in Fig. 16 represents the limit of the movement of the gripping finger in the direction to the left whereafter a new cycle of operation may be obtained, the gripping finger moving to the right to grip another film holding frame and in returning the curved portion 105 thereof engages the end of the previously exposed film and pushes the same to the left where it is deposited in the exposed film holding box.

In order that the film holding frame 104 which has been deposited on the supporting platform be aligned in the plane of exposure, a second pair of notches 116 is provided, one on each rear end of the film holding frame 104 opposite to the forward end on which the notches 103 are disposed. A stop member 117 is secured to a resilient member 118, the latter in turn being slidably mounted at one end thereof in a bracket 119, the latter bracket being fixed to the wall 120 upon which the ledge portion 106 is formed. The resilient member 118 is held in a normally extended position by means of a coil spring 121 disposed between a lip formed at right angles to the bracket 119 and a bracket 122 secured to the resilient member 118. The free end of the resilient member 118 is bent inwardly or away from the outer wall of the casing and extends through an aperture in the wall 120, this inwardly extending portion 123 engaging the gripping finger in order to hold the stop member 117 out of engagement with the notch member 103 as the film holding plate is carried to the supporting platform. However, the stop member 117 will be held in such an inoperative position until the notch 116 of the film holding frame comes into alignment therewith whereafter the stop member is urged thereinto by reason of the member 118 being resilient.

The momentum of the film holding frame 104 in its movement to the supporting platform is taken up by the coil spring 121, the frame 104 being permitted to pass slightly beyond the plane of exposure whereafter the coil spring 121 exerts sufficient energy to carry the film holding frame back directly into the plane of exposure which latter position is obtained by reason of the stop 124 provided on the resilient member 118 engaging the end of the bracket 119. Inasmuch as all of these movable elements previously recited relating to the shifting mechanism are duplicated on the other side of the apparatus, the same reference characters and the same description will apply to corresponding parts.

Figures 22, 23:
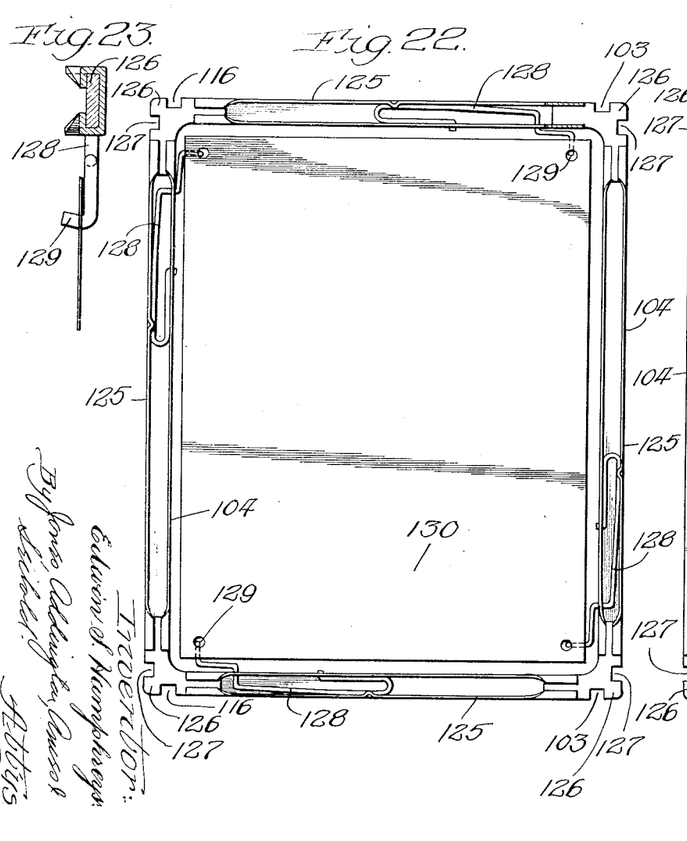
Fig. 22 is a bottom plan elevational view of the film holding plate of Fig. 21.
Fig. 23 is a fragmentary sectional view taken on the line 23—23 of Fig. 21.
Figure 24:
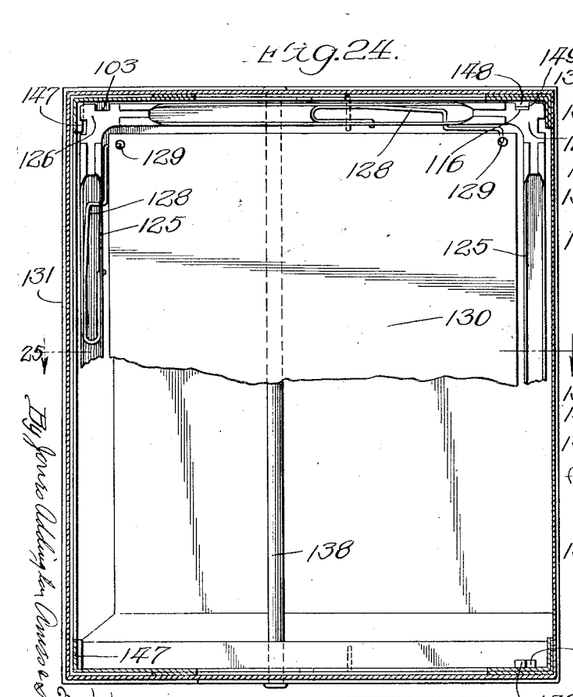
Fig. 24 is a plan sectional view of the unexposed film holding box.

The film holding frame 104 preferably comprises a plurality of channel shaped frame members 125 connected together at their adjacent ends by means of angle brackets 126. The connection may be provided by bending the walls of the channel members over the reduced portions of the brackets as shown in Fig. 23. The angle brackets 126 are provided with the hereinbefore described notches 103 and 116 and in addition thereto notches 127. A spring member 128 is disposed between the side walls of the channel member and comprises a stiff wire having one end thereof extending through the inner wall and having a hooked portion 129 on the extreme outer end thereof for engaging an aperture in one corner of the film 130. Similar spring members are disposed adjacent one end of each of the channel members 125 thereby providing a securing means for each corner of the film 130. These springs may be of any desired shape although it has been found preferable to form a loop at the opposite end to that of the hooked end and enclosing the same by means of the end of the loop extending through the channel wall. By means of this construction, a perfect tension may be obtained on the film; that is, the spring may exert a tension on the film in four different directions and thereby eliminate any warping of the film. Further, this construction acts as a centering means for the film.

The plates 104 before exposure are disposed in a container 131 comprising a sheet metal box of a size to snugly engage one end of the casing, the bottom of the box or container being hinged as at 132 to one of the side walls thereof and held in a closed position by means of an ordinary spring catch 133. The bottom is preferably composed of a pair of spaced sheet metal members having a lead plate therebetween in order that any secondary rays from the X-ray tube shall not enter and fog the films. The top and side walls of the casing being impervious to X-ray, it is not necessary that the side walls and top of the container 131 be lead sheathed.

As shown more particularly in Figs. 24 to 27, inclusively, a plurality of film holding frames are disposed in the container 131, while the latter is in an inverted position, the angle brackets 126 resting on lips provided in the four corners of the container which lips will hereinafter be more fully described. An opening 134 is provided in the forward and upper end of the container 131, when in an upright position, and extends laterally across the entire front wall and partially across the side walls. This opening is enclosed by means of a pate 135 extending in guides 136 which latter are secured to the side walls and extend but a short distance across the front wall in a spaced relation therefrom and from the side walls to permit the plate 135 to be guided therebetween. The plate 135 is operated into an open and a closed position by means of a lever arm 137 which is pivotally mounted on a rod 138 extending across the container and journalled in the side walls thereof. The free end 139 of the lever arm 137 engages a notched portion 140 of the plate 135.

When the rod 138 is given a partial rotation, the end 139 of the lever 137 operates the plate 135 into an open or a closed position. Inasmuch as the plate 135 should normally remain in a closed position, a coil spring 141 is disposed in a housing 142 which latter is secured to the top wall adjacent each side wall of the casing as by means of screws and bolts 143. One end of the coil spring 141 engages the rear wall of the casing and the other end thereof engages an ear 144 of an actuating arm 145. One end of the actuating arm 145 engages a cam surface 146 of the lever 137 and urges the end 139 upwardly to close the opening 134. Therefore, in order to draw the plate 135 away from the opening 134, the cam surface 146 exerts a pressure against the actuating arm 145 to compress the spring 141.

The previously described mechanism for operating the closure plate 135 is duplicated on both sides of the container 131 and therefore like reference numerals will apply to corresponding elements. The upper ends of the portions of the guides 136 extending across the front wall are bent at right angles to form ears 147 against which the forward connecting brackets 126 are urged. The rear connecting brackets 126 are urged against ears 148 preferably formed integrally on the ends of the actuating arms 145. Ears 149, similar in size and shape to the ears 148, are fixedly mounted on the side wall of the container 131 and in a normal closed position of the container are arranged in a staggered vertical relation with the ears 148 and directly thereabove. The normal inoperative position of the container is shown clearly in Fig. 25 of the drawings, wherein a plurality of plates are urged against the ears 147 and 148 by means of the compression springs 150, the latter being fixedly secured to the bottom hinged cover. The upper end of the springs 150 have a frame 151 secured thereto conforming substantially to the size and shape of the frame members and resting thereagainst.

Figure 25:
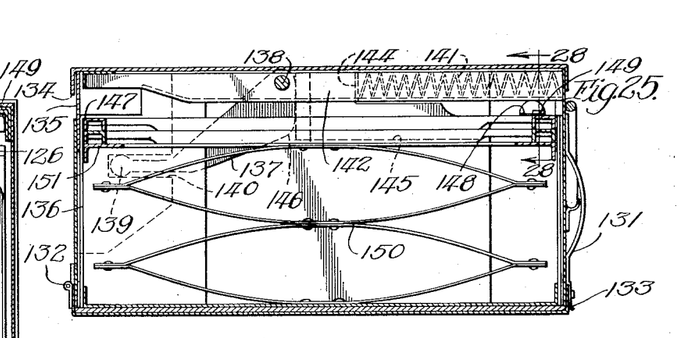
Fig. 25 is a vertical central sectional view of the film holding box taken on the line 25—25 of Fig. 24.

It has previously been recited that the gripping fingers 101 at one of the limits of their stroke engage the film holding frames 104 to present them to the supporting platform for exposure. Just prior to the time at which the gripping finger reaches the limit of its stroke, the rod 138 is given a partial rotation to clear the opening 134 so that the lip portion 102 of the gripping finger may engage the notch 103 of the film holding frame. As shown in Fig. 25 the film holding frame is not in position for gripping for the reason that it is not in the plane of the opening.

Figure 26:
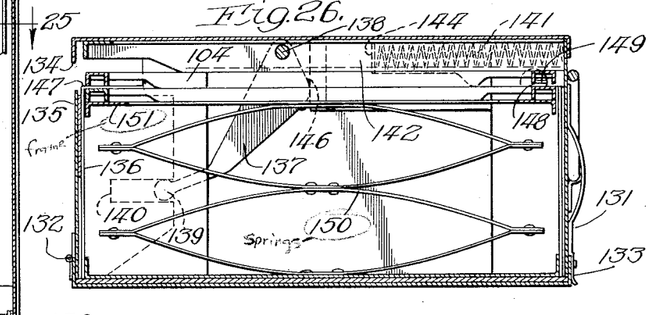
Fig. 26 is a view similar to Fig. 25 showing a changed position of the movable parts thereof.
Figure 27:
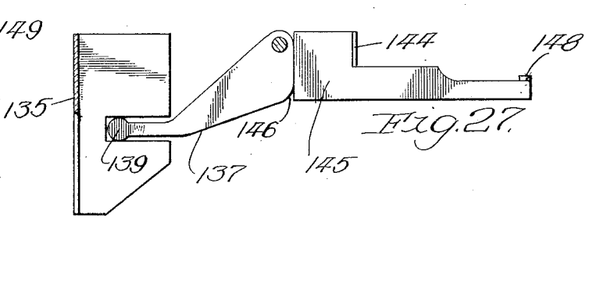
Fig. 27 is an elevational detail view of the operating mechanism of the non-exposed film holding box.
Figure 28:
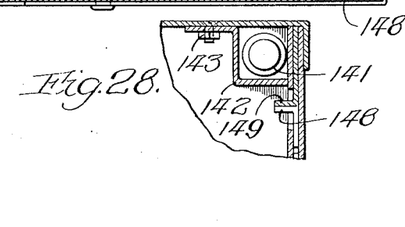
Fig. 28 is a detail sectional view taken on the line 28—28 of Fig. 25.
Figure 29:
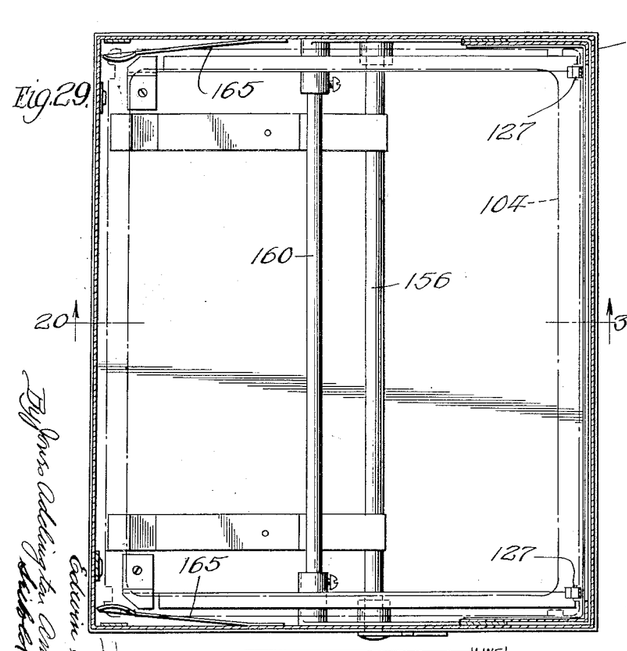

However, in Fig. 26 the actuating arm 145 has been urged, against the tension of the coil spring 141, to the right whereby the ear 148 registers with the opening 116 to permit the film holding plate to engage the ear 149. A further movement of the actuating arm 145 permits the ear 148 to move the film holding frame 104 rearwardly until the ears 148 and 149 are in alignment whereupon the film holding frame is urged upwardly past the ears by the spring 150 to engage and rest against the housing members 142. The movement rearwardly of the film holding frame 104 of course permits the connecting bracket 126 to disengage the forward lip 147. Thus a film holding frame 104 is presented in alignment with the opening 134 and may be withdrawn by means of the gripping fingers 101 engaging notches 103. A new film holding frame 104 is now engaged by the lips 147 and 148. This cycle of operation may be repeated indefinitely, that is, anyone or a number of the film holding frames deposited in the container may be withdrawn in rapid succession.

The film holding frame 104 is next presented for exposure as has hereinbefore been recited, whereafter it is automatically deposited in a receiving container 152. This latter container comprises a sheet metal box similar in all respects to the previously described container with the exception of the operating mechanism. An opening 152' is provided in the upper rear wall of the container and extends laterally thereof and part way around the side walls. This opening is normally closed by means of a plate 153 vertically slidable in guide members 154 similarly secured in the container as previously recited with reference to guide members 136.

Figure 30:
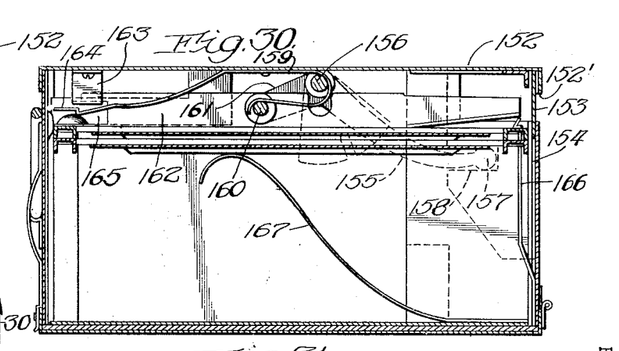
Fig. 30 is a vertical central sectional view taken on the line 30—30 of Fig. 29.

An operating lever 155 is fixedly mounted on a rod 156 which latter extends across the casing of. The end 157 of the lever 155 engages an aperture 158 in the closure plate 153 and operates the closure member 153 into an open or closed position with reference to the opening 152. The plate 153 is normally held in a closed position with reference to the opening 152 by means of a spring member 159 secured to the top side of the container, and having a looped portion extending therefrom, one end thereof bearing against a rod 160 and exerting a pressure thereagainst in a downward direction. The rod 160 is fixedly secured to the opposite free end 161 of the lever 155 and extends through longitudinally extending resting plates 162. Normally, the resting plates 162 are in a lowered position as shown in Fig. 30, one end thereof being limited in its downward movement by a bracket 163, and the normal inoperative position of the rod 160 acting as a second limit. The opposite end of the resting plate 162 is tapered upwardly to act as a guide for the film holding frames as they are deposited in the container.

In order to receive an exposed film and its film holding frame, the closure plate 153 is moved downwardly by means of a rotation of the rod 156 just prior to the gripping fingers reaching the limit of their movement in the direction toward the container. As the closure plate 153 moves downwardly the rod 160, being carried by the other end of the lever 155, moves upwardly against the tension of the spring 159 and carries with it the resting plates 162 into a position wherein the plates bear against the upper wall of the container such as is shown in Fig. 31.

The film holding frame 104 is moved through the opening 152 by the portion 105 of the gripping finger and is clamped in position within the container by means of the depressed end 164 of the spring 159. Inasmuch as a comparatively great amount of clearance may be required in moving the film holding frame into the container, spring centering guides 165 are provided. The guides 165 are secured at one end thereof to the side walls of the container and extend inwardly therefrom.

Figure 31:
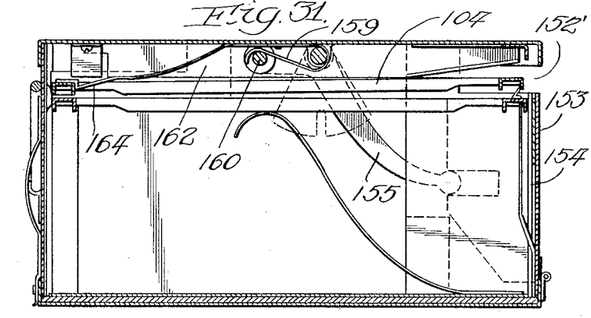
Fig. 31 is a view similar to Fig. 30 showing a changed position of the movable elements thereof.
Figure 32:
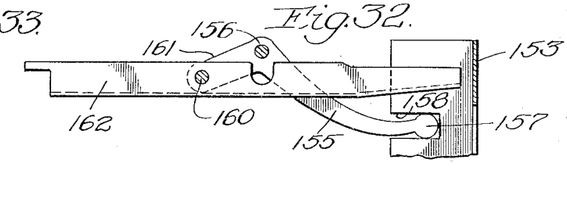
Fig. 32 is an elevational view of the operating mechanism for the exposed film box.

After the film holding frame has been inserted in this manner, as shown in Fig. 31, the rod 156 is partially rotated in an opposite direction whereby the resting plates 162 move downwardly on the rod 160 as the enclosure plate 153 moves upwardly to close the opening 152. The downward movement of the resting plates moves the film holding frame 104 downwardly beneath the guides 165 at the rear end of the container and spring clips 166 at the front end of the container, the notches 127 being in alignment with the spring clips 166. The film holding frames are urged upwardly against the spring guides 165 and the spring clips 166 by means of a spring 167 secured to the pivoted bottom cover, thereafter when the resting plates 162 are moved upwardly to receive another film holding frame, the previously received film holding frames are held in a secured position.

The rods 138 and 156 of the unexposed and exposed film containers respectively are operated by means of linkage mechanism connected to the actuator 70. A segmental member 168 is fixedly secured to the rod 138 on the outside side of the container and has a notch on the arcuate surface thereof for receiving a pin 169, the latter pin being formed preferably integrally on a bracket 170. The bracket 170 is, in turn, slidably mounted in a guide member 171 and is connected by integrally formed on the actuator 70.

A second segmental member 173 is mounted on the rod 156 on the outside side of the receiving container and has a notch in its peripheral edge to receive a pin 174 carried by a bracket 175 which latter engages a guide 176 and is slidable longitudinally thereof. The bracket 175 is connected by means of a link 177 to an ear on the actuator, the latter ear being diametrically disposed relative to the ear to which the link 172 is secured. When the actuator 70 is pivoted on the pin 71, the links 172 and 177 are extended away from each other or toward each other to actuate the segmental members 168 and 173, respectively, which, of course, provides for the opening and closing of the enclosure plates 135 and 153 and the other hereinbefore recited operating mechanism of the containers.

During a cycle of operation, the motor 37 is energized to operate the various operating mechanisms hereinbefore recited and it is desirable upon the deenergization of the motor after the completion of a cycle to terminate the movement of the movable parts substantially simultaneously therewith. In order to accomplish the aforementioned result, a pair of adjustable screws 178 and 179 are mounted on the bracket 63 which latter, as hereinbefore recited, is eccentrically and pivotally mounted on the gear 52. As the gear 52 is given a partial rotation, the end of either of the adjustable screws 178 or 179 engages the free end of a pivotally mounted lever 180 to move the latter upwardly. A lug 181, diametrically opposed relative to the pivotal point of the lever 180, engages a pivotally mounted brake shoe 182 which latter cooperates with the periphery of a brake drum 183.

The brake drum 183 is mounted on a shaft 184 which latter is journalled in and extends through the side wall of the casing. A pinion 185 is fixedly mounted on the shaft 184 and engages the teeth 186 described axially about the pivot 71 on the periphery of the actuator 70. Upon the operation of the actuator 70 in either direction, the gear 52 oscillates to bring the adjustable screws 178 or 179 into engagement with the lever 180 to release the brake 182 from the brake shoe 183. Normally, a spring 184 secured to the underneath side of the bracket 59 urges the brake shoe 182 into a firm engagement with the brake drum 183 and the adjustable screws 178 and 179 merely operate to release the tension on the brake drum whereafter it is immediately applied.

The shaft 184, previously recited, is journalled in and extends through the casing and has an arm 187 fixedly mounted thereon on the outside side of the casing wall within the auxiliary housing 36. A link member 188 is pivotally connected to the free end of the arm 187 and extends to be pivotally connected to the free end of an arm 189 which latter is pivotally mounted on a stud shaft 190. A ratchet wheel 191 and an armature 193 are fixedly mounted on the stud shaft 190, the arm 189 carrying a spring pressed pawl 194 for engagement with the ratchet wheel 191.

When the shaft 184 is rotated by the actuator 70, the arm 189 is partially rotated and the pawl 194 moves the ratchet wheel 191 and the armature 193 to a new position. A movement of the shaft 184 in the opposite direction permits the pawl 193 to slide past the teeth of the ratchet whereby the ratchet wheel and armature remains in its moved position by reason of the stationary spring pressed pawl 195 engaging the teeth of the ratchet 191. A plurality of spaced brush members 196, 197 and 198 are disposed peripherally of the armature 193 and engage the periphery thereof.

Figure 33:
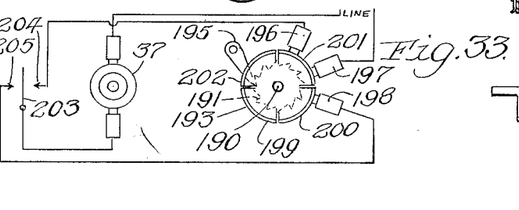
Fig. 33 is a wiring diagram of the electrical control circuit for the operation of the apparatus.

The armature 193 is composed of a plurality of segments 199, 200, 201 and 202, the segments being insulated from each other. Referring now more particularly to Fig. 33, it will be noted that the brush members 196 and 197 are connected in circuit due to their engaging a common segment 201. When the arm 203 of the two-way switch engages the contact member 204, an electrical circuit exists from one side of the line through brush 197, segment 201, brush 196, contact 204, arm 203, the motor 37 to the other side of the line thereby energizing the motor. The motor 37, in turn, actuates the train of mechanism previously described to rotate the armature 193 through a quarter revolution whereby the brush members 197 and 198 engage a common segment 200. However, an electrical circuit is not made therethrough and the motor is deenergized until the two-way switch is operated to move the arm 203 in engagement with the contact member 205. Whereafter an electrical circuit exists from one side of the line through the brush 197, segment 200, brush 198, contact 205, arm 203, the motor 37 to the other side of the arm. The motor, being energized, operates again in a manner as previously recited.

The above noted construction and mechanism have been recited with reference to the adaptation thereof to the study of the anatomy for permanent record as by means of making X-ray exposures. However, this structure may likewise be adapted for use for temporary observance as in fluoroscopic work. For this reason, a slidable door 206 has been disposed in the plane of exposure, that is, directly beneath the panel 60 and the supporting platform 53 in guideways in the bottom of the casing. A ground glass may be inserted therein to receive the rays of the X-ray tube. Although not shown, it may be desirable to position a plurality of mirrors disposed angularly to the ground glass plate to reflect the picture on the plate to a position in front of the apparatus. This arrangement is not shown in the present construction as it is not believed to be desirable to further complicate this showing.

While but a single embodiment of this invention is herein shown and described, it is to be understood that various modifications thereof may be apparent to those skilled in the art without departing from the spirit and scope of this invention, and therefore the same is to be limited solely by the scope of the prior art and the appended claims.

I claim:

1. A device comprising a casing having an exposure area, a container housing, a plurality of unexposed photographic plates in said container housing, a supporting platform in the path of said exposure area, a shifting mechanism for transferring one of said plates to said supporting platform for exposure, a motor for operating said shifting mechanism, and mechanism for terminating the operation of said motor upon the completion of a cycle of operation on said unexposed plates.

2. A device comprising a container housing, a plurality of photographic plates in said housing to be presented for successive radiographic exposures, stop members for limiting the movement of said plates, resilient means for urging said plates against said stop members, and automatic means for operating certain of said stop members to release one of said plate members for radiographic exposure.

3. A device comprising a container housing, a plurality of photographic plates in said housing to be presented for successive radiographic exposures, stationary and movable stop members for limiting the movement of said plates, resilient means for urging said plates against said stop members, and automatic means for operating said movable stop members to release one of said plate members for radiographic exposure.

4. A device comprising a lead sheathed casing having an opening therein, a panel for enclosing said opening and being transparent to X-rays, a movable platform in the path of said opening and cooperating with said panel, a container housing, a plurality of photographic plates in said container housing, means for successively releasing said plates, a shifting mechanism for successively presenting said plates to said movable platform to be clamped thereon for exposure, and a common actuating means for operating said releasing means, said shifting mechanism and said movable platform.

5. A device comprising, the combination with a casing, there being an exposure area in said casing, a plurality of photographic plates stacked in said casing, a compressor plate movable in the plane of said exposure area to sustain a photographic plate thereon, resilient means for centering photographic plates on said compressor plate, and means for actuating said compressor plate to momentarily sustain a photographic plate against said exposure area.

6. A device comprising the combination with a casing having an exposure area, of a pair of containers removably associated with said casing, plate holders adapted for stacked confinement in said containers, each of said containers having a slot along a wall thereof to enable the passage of plate holders therethrough, resilient means for urging the uppermost holder in one of said containers in the path of its slot, closures for said slots, means for normally maintaining said closures over said slots, and means for intermittently operating said closures and shifting said plate holders along a predetermined path from one container to the interior of the other container.

7. A device comprising, the combination with a casing, of a pair of containers removably associated with said casing, plate holders adapted for stacked confinement in said containers, each of said containers having a slot along confronting walls thereof to enable the successive passage of plate holders from one to the other, means for urging the end plate holder in one container in the path of its slot, closures normally covering said slot, means for intermittently operating said closures, means for withdrawing plate holders from one of said containers and effecting the transfer thereof along a predetermined path to the other of said containers in timed relation with said closure operating means, and a fluorescent screen mounted in said casing between said continers to enable the exposure of the plates in their holders during the intermittent travel thereof.

8. A device comprising, the combination with a casing, of a pair of containers removably mounted in said casing, plate holders adapted for stacked confinement in said containers, each of said containers having a slot along confronting walls thereof to enable the successive passage of plate holders from one to the other, means for urging of its slot, closures normally covering said slots, means for intermittently operating said closures, means for withdrawing plate holders from one of said containers, a compressor plate for receiving said plate holders as they are withdrawn, a portion of said withdrawing means transferring said plate holders from said compressor plate to the other of said containers, and means for operating said closure and withdrawing means in timed relation.

9. A device comprising, the combination with a casing, of a pair of containers removably associated with said casing, plate holders adapted for stacked confinement in said containers, each of said containers having a slot along confronting walls thereof to enable the successive passage of plate holders from one to the other, means for normally urging the end plate holder in one of said containers within the path of its slot, closures for normally covering said slots, means for intermittently removing said closures from said slots, means for withdrawing plate holders successively from one of said containers to a position of rest between said containers, a portion of said withdrawing means transferring the plate holder from the resting position to the other of said containers in timed relation with said closure operating means, a fluorescent screen mounted in the wall of said casing in the plane of the plate holders' resting position to enable the exposure thereof, a compressor plate holder support beneath said fluorescent screen, to support a plate thereon in its resting position, and link means for reciprocating said compressor plate against said fluorescent screen during the exposure of the plate.

10. A device comprising a container housing, a plurality of photographic plates in said housing, a conveying mechanism for said plates, means in said container housing for releasing said plates in successive intermittent timed relation, and means on said conveying mechanism for presenting said released plates for exposure.

11. A device comprising a container housing, a plurality of unexposed photographic plates in said container housing, a carrier mechanism, means in said container housing for releasing one of said plates, and automatic means for operating said releasing means and said carrier mechanism to present said released plate for exposure.

12. A device comprising a casing having an exposure area, a pair of spaced containers in said casing, a plurality of unexposed photographic plates stacked in one of said containers, a shifting mechanism therebetween for selectively presenting said plates in succession from the stacked container for exposure and transfer to the other of said containers, and means for automatically operating said shifting means in regular predetermined timed sequence.

13. A device comprising a casing having an exposure area, a pair of spaced containers in said casing, a plurality of unexposed photographic plates stacked in one of said containers, the other container serving to receive exposed photographic plates, a supporting platform in the path of said exposure area, a shifting mechanism for successively transferring said unexposed plates from the stacked container to the supporting platform for exposure, and means on said shifting mechanism for transferring the exposed plates to the other of said containers in a cycle of successive operations.

14. A device comprising a casing having an exposure area, a container in said casing, a plurality of unexposed photographic plates confined in said container housing, a supporting platform in the path of said exposure area, a shifting mechanism for transferring one of said plates to the supporting platform for exposure, a motor circuit, a motor in said circuit for operating said shifting mechanism, a two way switch in the motor circuit, and mechanism for ceasing the operation of said motor upon the completion of a cycle of operations.

15. A device comprising a casing having an exposure area, a container in said casing, a plurality of unexposed photographic plates confined in said container, means for successively releasing said plates from said container, a shifting mechanism for successively presenting said released plates to said exposure area, and means for actuating said releasing means and said shifting mechanism in timed relation to effect successive release and exposure of said plates.

16. A device comprising a lead sheathed casing having an exposure area transparent to X-rays, detached photographic plates stacked in said casing, a movable compressor plate in the path of said exposure area, means for successively transferring said photographic plates to said compressor plate for exposure, means for centering said photographic plates on said compressor plate, and means to render said compressor plate operative to clamp successive photographic plates in a firm position during exposure.

17. A device comprising a lead sheathed casing having an exposure area transparent to X-rays, detachable photographic plates stacked in said casing, a movable compressor plate in the path of said exposure area, means for successively shifting said photographic plates to said compressor plate for exposure, means responsive to the predetermined operation of said shifting means for operating said compressor plate vertically to receive and clamp said photographic plates in a firm position during exposure, and spring means for centering said photographic plates on said compressor plate prior to the clamping action.

18. A device comprising a lead sheathed casing having an opening therein, a panel for enclosing said opening without affecting permeability, a plurality of detached unexposed photographic plates stacked in said casing, a movable compressor plate in the path of said opening and said panel, power driven means for successively shifting said photographic plates to said compressor plate, means for centering said photographic plates on said compressor plate, and means responsive to said shifting means for clamping said photographic plates in a firm position for exposure between said panel and compressor plate.

19. A device comprising a lead sheathed casing having an opening therein, a plurality of detached unexposed plates in said casing, a panel for enclosing said opening without affecting X-ray permeability, a movable platform in the plane of said opening and cooperating with said panel, fluorescent screens disposed on each of the cooperating surfaces of said panel and said platform, and means for successively shifting said photographic plates to said movable platform and between said fluorescent screens, means for centering said photographic plates between said fluorescent screens, and means for displacing said movable platform to clamp said photographic plates in centered position.

20. A device comprising a casing impermeable to light rays, there being an exposure opening in said casing, a container removably associated with said casing, photographic plates arranged in stacked relation within said container, and mechanically operated means for successively shifting said plates in timed sequence to effect regular predetermined succession to said casing opening for timed exposure thereof.

21. In an X-ray device the combination with a casing, containers removably associated with said casing for confining a plurality of photographic films, photographic films stacked in one of said containers, there being an exposure area in said casing between said containers, means in said stacked container for successively releasing one of said photographic plates, and means for shifting the released photographic films from the stacked container to the other container across said exposure area.

22. In an X-ray device the combination with a casing, containers removably associated with said casing for confining a plurality of photographic films, photographic films stacked in one of said containers, there being an exposure area in said casing between said containers, means in said stacked container for successively releasing one of said photographic plates, and means for shifting the released photographic films from the stacked container to the other container across said exposure area, said last named container having a photographic plate receiving opening, a closure for said photographic plate receiving opening, and means for normally urging said closure over said plate receiving opening.

23. In an X-ray device the combination with a casing, containers removably associated with said casing for confining a plurality of photographic films, photographic films stacked in one of said containers, there being an exposure area in said casing between said containers, means in said stacked container for successively releasing one of said photographic plates, and means for shifting the released photographic films from the stacked container to the other container across said exposure area, said last named container having a photographic plate receiving opening, a closure for said photographic plate receiving opening, means for normally urging said closure over said plate receiving opening, and means responsive to said shifting means to momentarily remove said container closure from said receiving opening to admit an exposed photographic plate therethrough for placement in said receiving container.

24. In a device of the character described, the combination with a casing, there being an exposure area in said casing, a compressor plate movable in the plane of said exposure area, a plurality of photographic plates stacked in said casing, means for successively transferring said photographic plates to said compressor plate for exposure, means for centering the photographic plates on said compressor plate, and means for actuating said compressor plate in timed relation with said transferring means to firmly sustain said photographic plates during exposure.

25. A serial roentgenogram device comprising a body, a chamber for cassettes at each end of said body, a carrier intermediate said chambers, and a chamber unloading stop, said carrier and said stop being adapted to be moved in the same direction, the movement of said stop being of less magnitude and incidental to the movement of said carrier.

26. A serial roentgenogram device comprising a body, a chamber at each end of said body, film supporting means adapted for initial stacked confinement in one of said chambers, a carrier intermediate said chambers, means for sustaining said film supporting means in said chambers, and a chamber unloading stop mechanism, means for guiding said carrier and said unloading mechanism for movement in the same direction, the movement of said unloading stop mechanism being of less magnitude and incidental to the movement of said carrier.

27. A serial roentgenogram device comprising a body, a chamber at each end of said body, film supporting means adapted for initial stacked confinement in one of said chambers, a carrier intermediate said chambers, means for sustaining said film supporting means in said chambers, a chamber unloading stop mechanism, means for guiding said carrier and said unloading mechanism for movement in the same direction, the movement of said unloading stop mechanism being incidental to the movement of said carrier, and means for shifting said carrier in a predetermined direction for successively transferring said film supporting means from one chamber to the other.

28. A serial roentgenogram device comprising a body, a chamber at each end of said body, an exposure area provided in said body intermediate said chambers, film supporting means adapted for initial stacked confinement in one of said chambers, a carrier intermediate said chambers, means for sustaining said film supporting means in said chambers, a chamber unloading stop mechanism, means for guiding said carrier and said unloading mechanism for movement in the same direction, the movement of said unloading stop mechanism being incidental to the movement of said carrier, and means for shifting said carrier in a predetermined direction for successively transferring said film supporting means from one chamber to said exposure area and then to the other chamber.

29. A serial roentgenogram device comprising a body, a chamber at each end of said body, an exposure area provided in said body intermediate said chambers, film supporting means adapted for initial stacked confinement in one of said chambers, a carrier intermediate said chambers, means for retaining said film supporting means in said chambers against accidental displacement, means for singly unloading said film supporting means from initial stacked confinement in said chamber, means for guiding said carrier and said unloading means for movement in the same direction, and means for shifting said carrier and said unloading means in a predetermined direction for successively transferring single film supporting means from one chamber to said exposure area and then to the other chamber.

EDWIN S. HUMPHREYS.